(12) United States Patent
Seidel et al.

(10) Patent No.: US 8,733,740 B2
(45) Date of Patent: May 27, 2014

(54) SUPPORT JACK

(75) Inventors: Günter Seidel, Riedstadt (DE); Gerald Müller, Obertshausen (DE)

(73) Assignee: Jost-Werke-GmbH, Neulsenburg (DE)

( * ) Notice: Subject to any disclaimer, the term of this patent is extended or adjusted under 35 U.S.C. 154(b) by 295 days.

(21) Appl. No.: 13/415,974

(22) Filed: Mar. 9, 2012

(65) Prior Publication Data

US 2012/0174377 A1 Jul. 12, 2012

Related U.S. Application Data

(62) Division of application No. 11/996,562, filed as application No. PCT/EP2006/007146 on Jul. 20, 2006, now Pat. No. 8,157,247.

(30) Foreign Application Priority Data

Jul. 23, 2005 (DE) .......................... 10 2005 034 554

(51) Int. Cl.
B60S 9/04 (2006.01)

(52) U.S. Cl.
USPC ........................................ 254/419; 254/418

(58) Field of Classification Search
USPC .................................. 254/418–427
See application file for complete search history.

(56) References Cited

U.S. PATENT DOCUMENTS

| 2,815,962 A | 12/1957 | McKay |
| 3,489,395 A | 1/1970 | Glassmeyer .................... 254/86 |
| 3,880,403 A | 4/1975 | Glassmeyer .................... 254/86 |
| 5,238,266 A | 8/1993 | VanDenberg |
| 5,676,018 A | 10/1997 | VanDenberg |
| 6,062,545 A | 5/2000 | Peavler .......................... 254/418 |
| 6,099,016 A * | 8/2000 | Peveler .......................... 280/475 |
| 6,764,065 B2 | 7/2004 | Fox ................................ 254/420 |
| 6,846,016 B2 | 1/2005 | VanDenberg et al. ..... 280/763.1 |
| 7,163,207 B2 | 1/2007 | Baird et al. ................. 280/6.153 |
| 7,398,959 B2 | 7/2008 | VanDenberg et al. ........ 254/419 |
| 8,096,529 B2 * | 1/2012 | Muller et al. .................. 254/419 |
| 8,157,247 B2 * | 4/2012 | Seidel et al. .................. 254/424 |
| 8,276,885 B2 | 10/2012 | Müller et al. |
| 8,276,941 B2 * | 10/2012 | Riedl .......................... 280/766.1 |
| 8,388,023 B2 * | 3/2013 | Birkholz et al. ........... 280/763.1 |
| 8,579,326 B2 * | 11/2013 | Righetti ..................... 280/766.1 |
| 2003/0089898 A1 | 5/2003 | Straw, Sr. et al. |
| 2008/0224113 A1 * | 9/2008 | Muller et al. ................. 254/419 |
| 2012/0126520 A1 * | 5/2012 | Righetti ..................... 280/766.1 |
| 2012/0174377 A1 * | 7/2012 | Seidel et al. ..................... 29/428 |

FOREIGN PATENT DOCUMENTS

| CA | 2 339 156 A1 | 2/2000 | ................ B60S 9/08 |
| CA | 2 404 749 A1 | 10/2002 | ................ B60S 9/08 |
| DE | 198 36 635 A1 | 2/2000 | ................ B60S 9/08 |
| DE | 100 17 322 A1 | 10/2001 | ................ B60S 1/04 |
| WO | WO 81/01691 | 6/1981 | |

* cited by examiner

Primary Examiner — Lee D Wilson
(74) Attorney, Agent, or Firm — Brinks Gilson & Lione

(57) ABSTRACT

A support jack for supporting semitrailers includes a vertically telescopically displaceable supporting device having an outer sleeve and an inner sleeve. A method of assembling such a support jack, in which a spindle nut is connected detachably to the inner sleeve by means of at least one translatory and one rotary joining movement or at least by means of two translatory joining movements.

4 Claims, 6 Drawing Sheets

View from Fig. 6

SUPPORT JACK

CROSS-REFERENCE TO RELATED APPLICATIONS

This is a divisional application of U.S. Ser. No. 11/996,562 filed Jan. 23, 2008 now U.S. Pat. No. 8,157,247, which is a U.S. National Stage application of PCT/EP2006/007146 filed Jul. 20, 2006 claiming benefit of German national application DE102005034554.9 filed Jul. 23, 2005.

BACKGROUND

The invention relates to a support jack, in particular, for supporting semitrailers, said support jack comprising a vertically telescopically displaceable supporting device having an outer sleeve and an inner sleeve, a spindle and a spindle nut, which interacts with the spindle and is fixed to the inner sleeve. The invention also relates to a method of assembling such a support jack.

Such a support jack has been described by way of example in EP 1 104 369 B1. The spindle nut is directly inserted into the inner sleeve at the upper end of the inner sleeve and fixed in the latter. The support collar of the spindle nut rests on the front surface of the inner sleeve and is detachably connected thereto. The support collar of the spindle nut is adapted to suit the inner dimensions of the outer sleeve so that the spindle nut abuts against the inner side of the outer sleeve and is thus prevented from rotating.

Embossing or pinning are processes known from the prior art for fixing the spindle nut to the inner sleeve. However, the inner sleeve also had to be replaced whenever it was necessary to replace the spindle nut.

US 2003/0089898 A1 describes a support jack, the inner sleeve of which is non-detachably connected to a spindle nut locator. This spindle nut locator is fitted on the inner sleeve and non-detachably connected to the inner sleeve by means of bent tabs. The spindle nut locator has an insertion slot, into which the spindle nut can be inserted laterally. By providing the spindle nut and the insertion slot with mutually adapted designs, the spindle nut is prevented from rotating in the spindle nut locator and moving axially in the longitudinal direction of the support jack. One of the disadvantages of this support jack is that its assembly is expensive since it requires an additional component, namely, the spindle nut locator.

It is the object of the invention to create a support jack, which can be assembled easily and which enables a replacement of the spindle nut. It is also an object of the invention to specify a suitable method of assembling such a support jack.

SUMMARY

This object is achieved by providing a support jack in which the spindle nut comprises first means and second means for being positively, detachably connected to the sleeves, the first means interacting with means of the inner sleeve for fixing the spindle nut in the direction of the longitudinal axis of the support jack, and the second means interacting with means of the outer sleeve for fixing the spindle nut in the direction of rotation about the longitudinal axis. The means of the inner sleeve are preferably designed such that they ensure that the support jack is locked in position in both opposing directions of the longitudinal axis of the support jack.

The provision of all the means involved in positively connecting the spindle nut to the sleeves makes it possible to dispense with additional measures, such as e.g. embossing or welding, or additional fixing means such as fastening pins or the like. The spindle nut is joined to the sleeves alone. This enables an interaction between the means provided on the spindle nut and the sleeves for locking the spindle nut in position.

The positive connection of the spindle nut to the sleeves is designed to be detachable, thus making it also possible to easily replace the spindle nut.

The method suggested by the invention for assembling such a support jack is characterized in that the spindle nut is detachably connected to the inner sleeve by means of at least one translatory and one rotary joining movement or at least two translatory joining movements.

The second means of the spindle nut preferably interact with the means of the inner sleeve and/or with the means of the outer sleeve for fixing the spindle nut in the direction extending perpendicularly to the longitudinal axis of the support jack as well. This helps fix the support jack in all spatial directions and also prevent it from rotating.

The term "joining movement" is meant to connote an assembly of the components without additional fixing means.

These joining movements can be performed using suitable assembly machines. However, it is also possible to assemble the spindle nut manually.

There are two preferred methods of assembly.

According to a first embodiment, the spindle nut is inserted into the inner sleeve in the direction of the longitudinal axis of the inner sleeve, and then the spindle nut is rotated about the longitudinal axis relative to the inner sleeve until the spindle nut reaches its end position.

In the second embodiment, the spindle nut is inserted into the inner sleeve in the direction of the longitudinal axis of the inner sleeve, and the spindle nut is displaced perpendicularly to the longitudinal axis until it has reached its end position.

Appropriate embodiments of the spindle nut and sleeves have been provided in terms of design.

The means of the inner sleeve preferably comprise at least two projections, which extend inwardly, preferably in the radial direction, and which engage in those corresponding openings or depressions of the spindle nut that form the first means of the spindle nut.

In another embodiment, the first means of the spindle nut comprise at least two projections, which extend outwardly, preferably in the radial direction, and which engage in corresponding openings or depressions of the inner sleeve. The projections can preferably be inserted into the openings of the inner sleeve. The openings can be enclosed or they can open toward the front side of the inner sleeve.

The openings can be provided with an oblong and/or L-shaped design.

For assembly, the spindle nut is inserted from the top into the inner sleeve. The spindle nut is inserted in a rotated form, i.e., the projections preferably point toward the corner areas of the inner sleeve. When the spindle nut rests on the front surface of the inner sleeve, the spindle nut is rotated so that the projections engage in the corresponding openings of the inner sleeve. The openings can also be designed such that they form a stop for defining the end position of the spindle nut, thus causing the spindle nut to be fixed in the direction extending perpendicularly to the longitudinal axis of the support jack.

The means of the inner sleeve can also comprise at least one slot, which is open toward the edge of the inner sleeve and into which the projection/s of the spindle nut can be inserted. This slot extends preferably from the upper edge of the inner sleeve downward and merges into a horizontal slot. In this embodiment, an opening is preferably provided in an adjacent wall of the inner sleeve such that another projection of the spindle nut can engage in said opening.

The spindle nut is inserted from the top such that the projection of the spindle nut is initially moved downward into the vertical slot and then displaced horizontally. During the horizontal movement, at least one other projection of the spindle nut engages in a corresponding opening in a wall of the inner sleeve. The spindle nut is assembled using at least two translatory joining movements altogether.

The spindle nut preferably has a rectangular outer contour and a projection is disposed on each of its outer sides.

If the inner sleeve comprises projections and the spindle nut comprises openings or depressions, the spindle nut is assembled in the same manner as described above.

The projections are preferably disposed eccentrically. The advantage of this eccentric arrangement of the projections is that if the spindle nut is assembled using rotary joining movements, it is necessary to rotate the spindle nut only slightly in relation to the inner sleeve in order to assemble the spindle nut.

The second means of the spindle nut preferably comprise at least one contact element, which abuts against the inner side of the outer sleeve. This contact element is preferably flush with the outer side of the inner sleeve so that firstly the ability of the inner sleeve to move within the outer sleeve is maintained and secondly the spindle nut is prevented from rotating. Similar to the inner sleeve, the contact element thus abuts against the inner side of the outer sleeve. In particular, the rectangular design form of the spindle nut enables such a contact element to be provided on each side thereof. In addition to preventing the spindle nut from rotating, the contact elements together with the outer sleeve fix the spindle nut in the direction extending perpendicularly to the longitudinal axis of the support jack.

This contact element is the support collar that is usually already present on the spindle.

The support collar preferably has an outer contour or outer surfaces, which is/are adapted to suit the inner contour of the outer sleeve.

The support collar preferably comprises a recess in the region above each of the projections. This embodiment has advantages relevant to the manufacturing process since it makes it possible to dispense with undercuts and thus cores or complicated mold parting lines in the case of a cast spindle nut.

The outer surfaces of the spindle nut are preferably recessed below and between the projections in relation to the front surface of the projections.

BRIEF DESCRIPTION OF THE DRAWINGS

Exemplary embodiments of the invention are explained in more detail below with reference to the drawings, in which.

DESCRIPTION OF PREFERRED EMBODIMENTS

Figure 1:
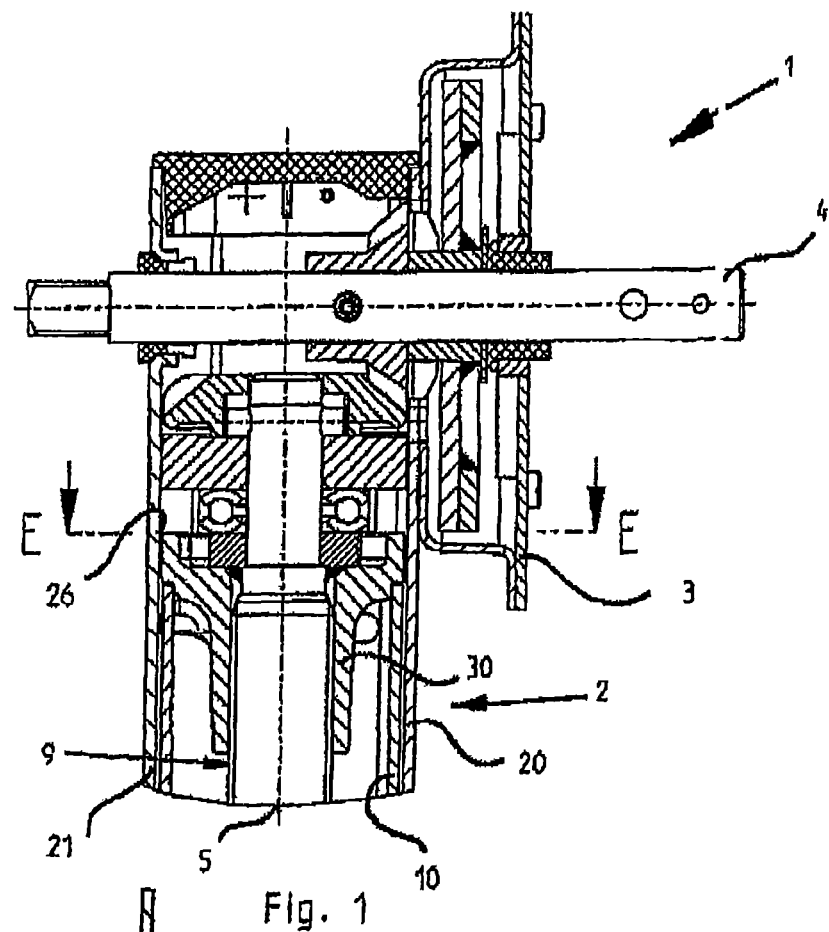
FIG. 1 is a vertical section of a support jack.

FIG. 1 shows the vertical section of the upper part of a support jack 1. The support jack 1 comprises a supporting device 2, which comprises an inner sleeve 10 and an outer sleeve 20, it being possible to telescope the inner sleeve 10 downwards. The inner sleeve and the outer sleeve can consist of a square profile. For this purpose, a spindle 9 and a spindle nut 30 are provided in the longitudinal axis 5 of the support jack 1. The spindle nut 30 is supported on the inner sleeve 10. Furthermore, a transmission, a gearbox 3, and an input shaft 4 are provided. The gear construction is not relevant to the present invention.

Figure 2:
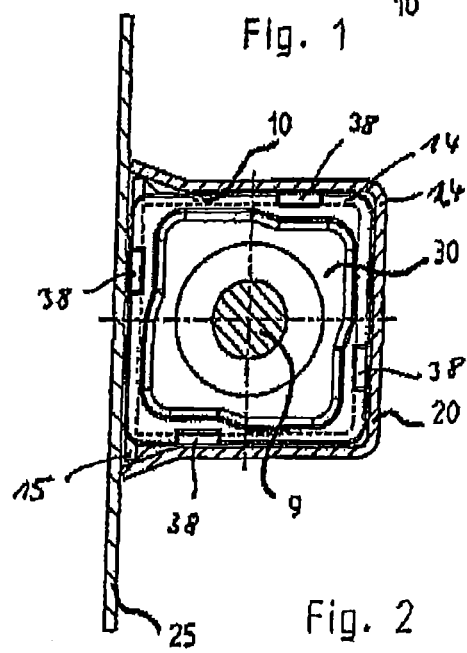
FIG. 2 is a horizontal section taken along line E-E through the support jack shown in FIG. 1.

FIG. 2 shows a section taken along line E-E through the support jack 1 shown in FIG. 1. It is apparent that both the inner sleeve 10 and the outer sleeve 20 in this exemplary embodiment are each manufactured from a U-profile 14, 24 and a wall plate 15, 25 respectively. The wall plate 25 of the outer sleeve 20 is mounted on a fixing element of a vehicle (not shown). In the inner sleeve 10 there is disposed a spindle nut 30, which will be explained in detail in conjunction with the following figures. The support collar 37 of the spindle nut 30 rests on the front surface 17 of the inner sleeve. The outer contour of the support collar 37 corresponds to the inner contour of the outer sleeve 20, which locks the spindle nut 30 in position.

Figure 3:
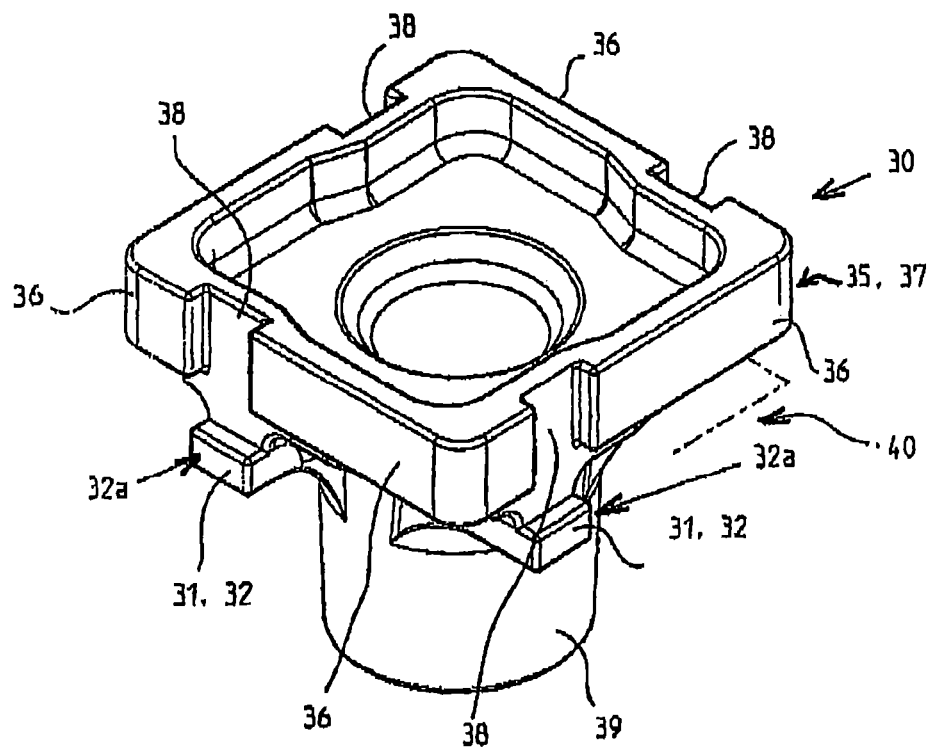
FIG. 3 is a perspective view of a spindle nut.

FIG. 3 shows a perspective view of the spindle nut 30. In its lower region, the spindle nut 30 comprises a cylindrical section 39, on the upper part of which projections 32 are disposed, which extend outwardly in the radial direction and form the first means 31.

Figure 4:
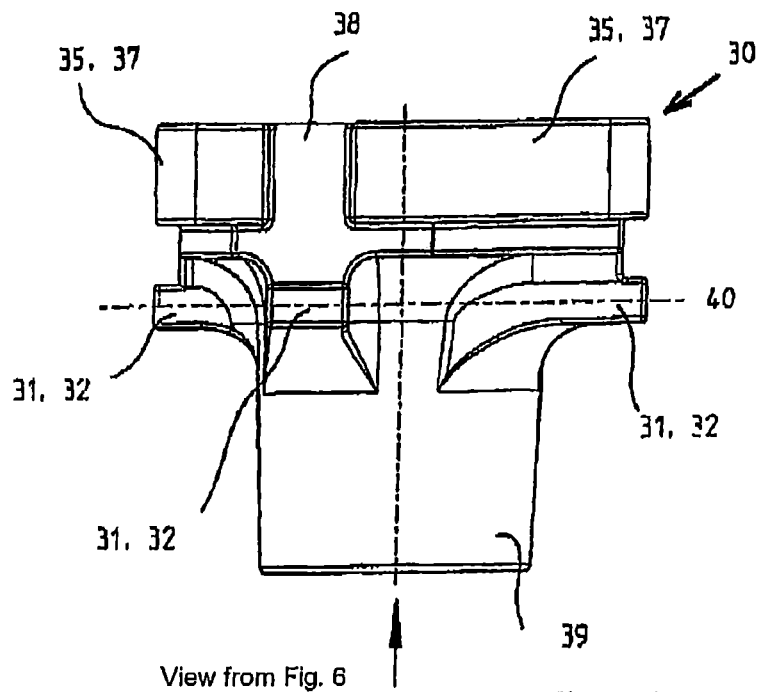
FIG. 4 is a side view of the spindle nut shown in FIG. 3.

As can be seen in FIG. 4, these projections have a rectangular design and are molded on to the cylindrical section 39. The projections 32 interact with openings 13 in the inner sleeve 10 (see FIG. 7).

The projections 32 are located in a plane 40 below the support collar 37, which is formed of altogether four contact elements 36, which extend beyond the corners and represent the second means 35. The lower side of the support collar 37 rests on the front surface 17 of the inner sleeve 10 while the peripheral surface of the contact elements 36 abuts against that inner side 26 of the outer sleeve 20 that forms the means 21.

As follows from FIG. 4, the contact elements 36 protrude outwardly to the same extent as the projections 32, which are all disposed in the plane 40. Between the support collar 37 and the projections 32, the spindle nut 30 is recessed in relation to the front surfaces 32a of the projections 32.

Recesses 38 are provided above the eccentrically disposed projections 32 and between the contact elements 36. This embodiment is advantageous in terms of the manufacturing process. The support collar 37 could also be designed without such type of recesses so that only one contact element 36 would be present, which would be identical to the support collar 37.

Figure 5:
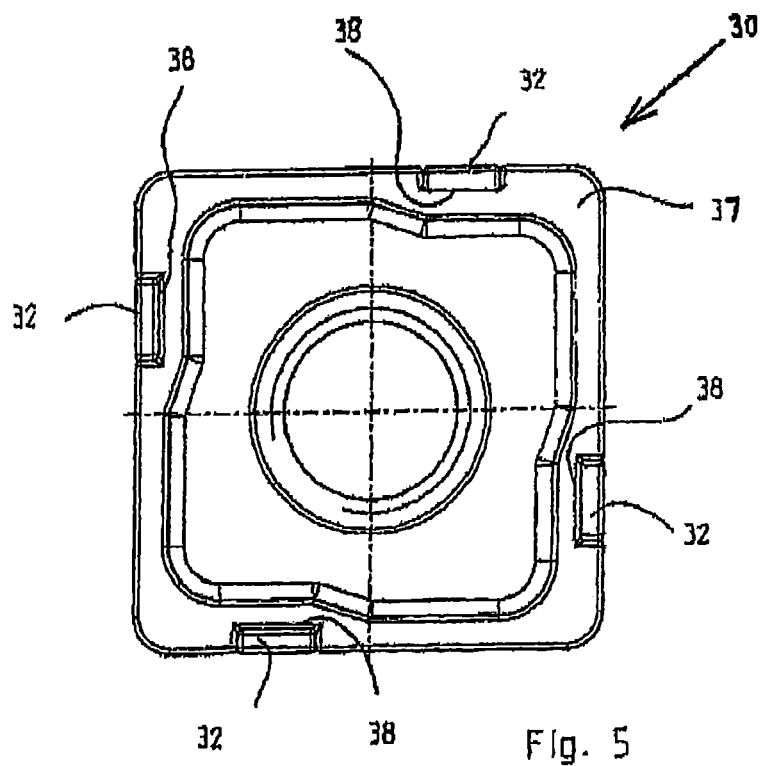
FIG. 5 is a plan view of the spindle nut shown in FIG. 3.
Figure 6:
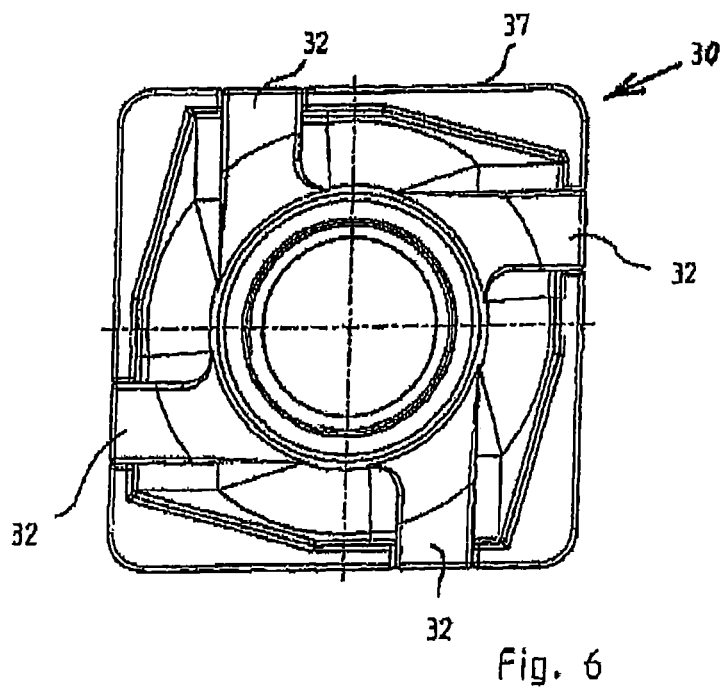
FIG. 6 is a bottom view of the spindle nut shown in FIG. 4.

FIG. 5 is a plan view of the spindle nut 30 and FIG. 6 is a bottom view of the spindle nut shown in FIG. 4.

Figure 7:
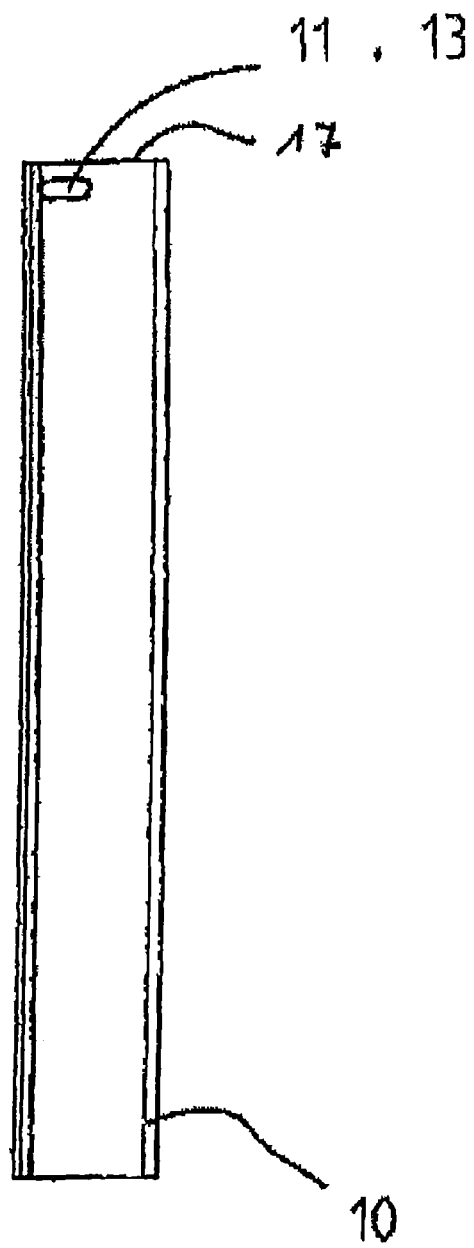
FIG. 7 is a side view of an inner sleeve.

FIG. 7 is a side view of an inner sleeve 10, which comprises means 11 in its upper region. In the embodiment illustrated here, these means 11 consist of openings 13, which are oblong in the horizontal direction, and FIG. 7 shows only one opening 13. A corresponding projection 32 of the spindle nut 30 engages in this opening 13. This embodiment is suitable for that method of assembling a support jack in which the spindle nut 30 is inserted from the top and then rotated.

Figure 8:
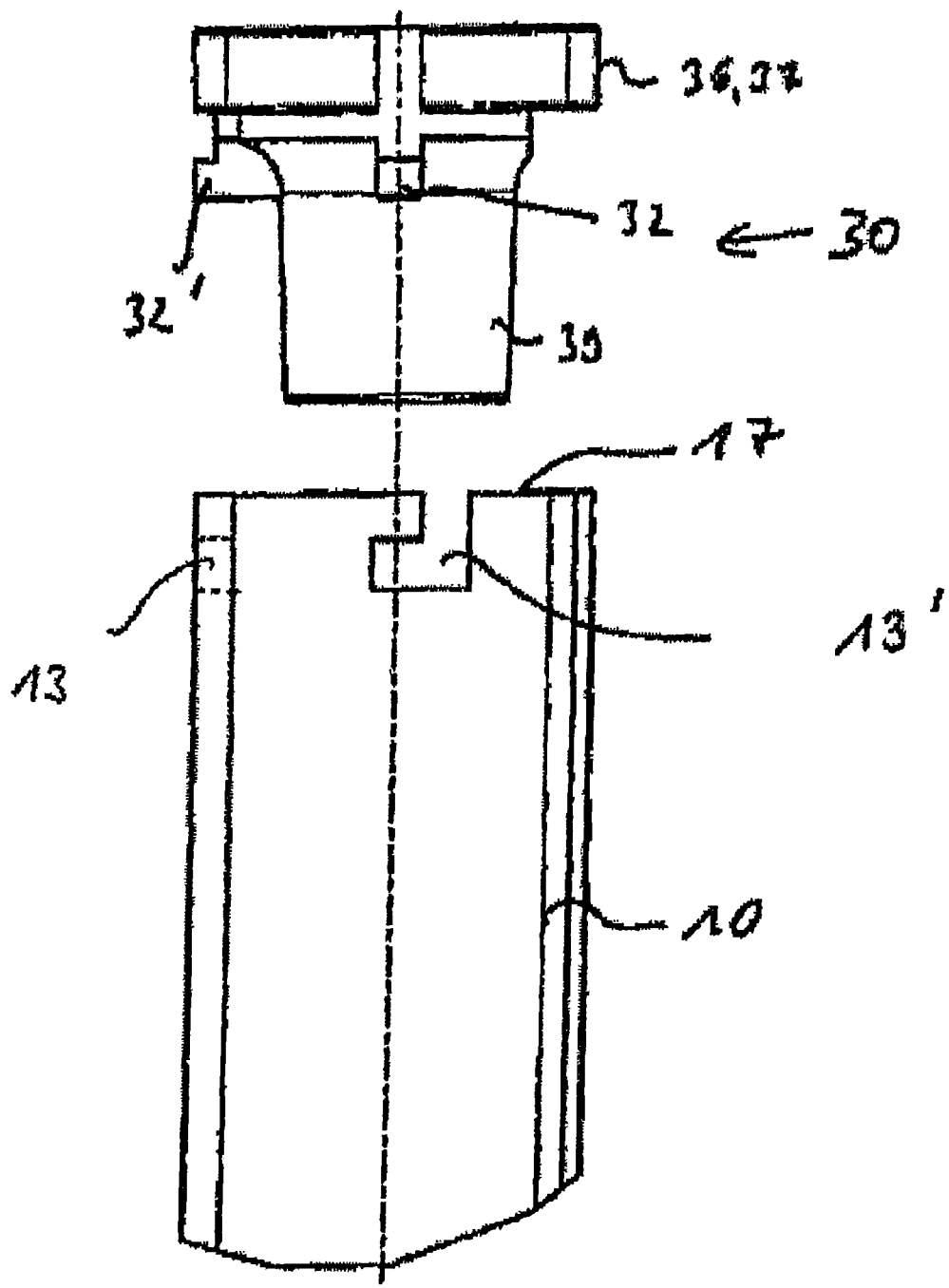
FIG. 8 is a side view of a spindle nut and an inner sleeve according to another embodiment.

FIG. 8 shows another embodiment of the spindle nut 30 and the inner sleeve 10. The spindle nut 30 comprises projections 32, 32' on three sides, of which the rear projection is not visible. The fourth side has no projection.

The inner sleeve 10 comprises L-shaped openings 13', which are located on two opposite sides and which open toward the front surface 17. The spindle nut 30 is inserted from the top into the inner sleeve 10, the opposite projections 32 being initially pushed downwards into the L-shaped openings 13' and then moved in the horizontal direction. When the end position is reached, the projection 32' engages in the corresponding opening 13 in the left sidewall of the inner sleeve 10. In the end position, the outer contour of the support collar 37 is aligned with the outer contour of the inner sleeve 10.

Figure 9:
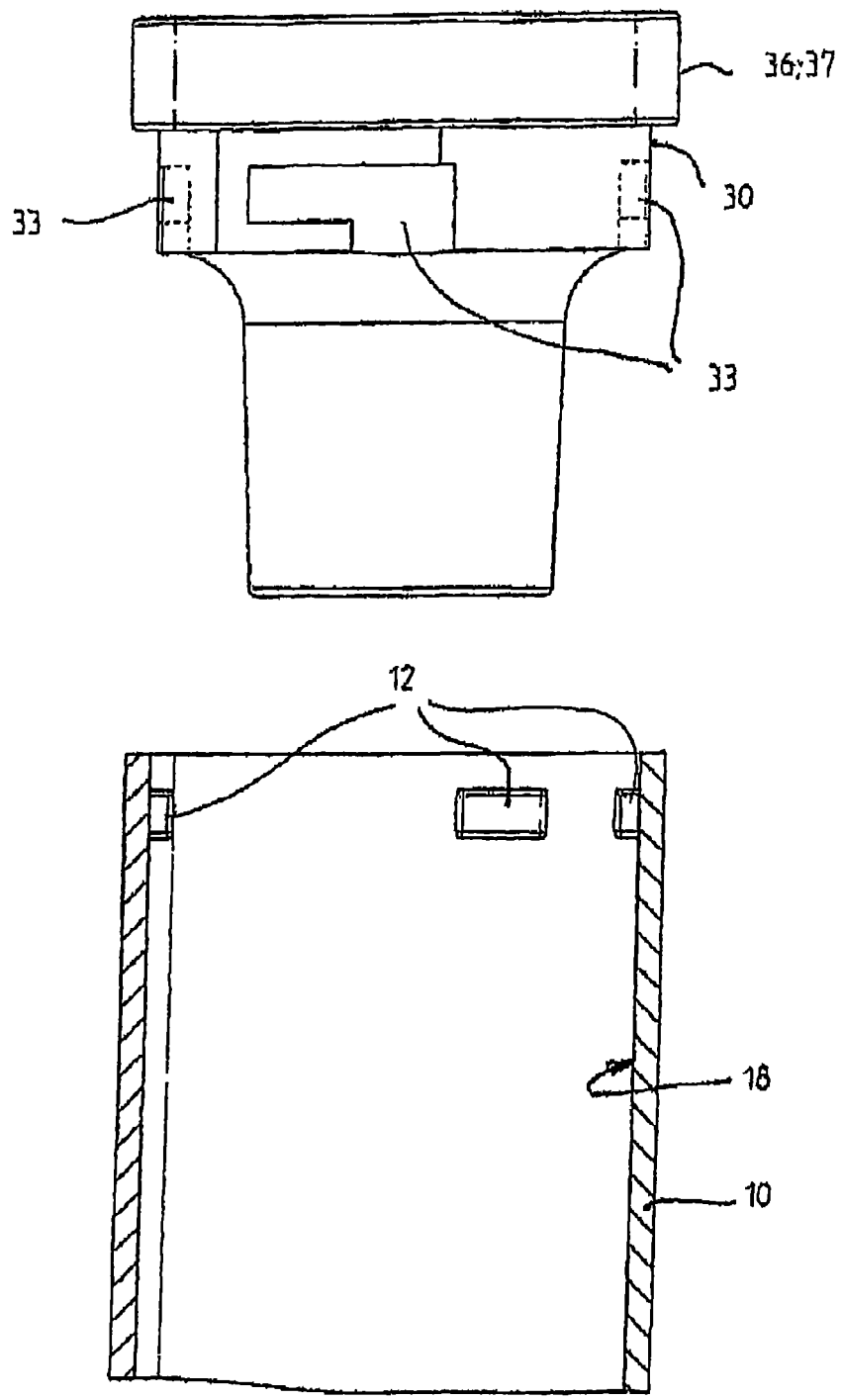
FIG. 9 is a vertical section of an inner sleeve and a side view of a spindle nut according to another embodiment.

FIG. 9 shows another embodiment of the spindle nut 30 and the inner sleeve 10. Unlike the preceding embodiments, the inner surface 18 of the inner sleeve 10 comprises inwardly protruding projections 12. These projections 12 interact with those openings 33 of the spindle nut 30 that are disposed below the support collar 37. These openings are oblong recesses or depressions 33. Unlike the preceding embodiments, the projections and openings or depressions in this embodiment are interchanged between the inner sleeve 10 and the spindle nut 30. The assembly operation can be similar to that described in connection with the preceding embodiment.

LIST OF REFERENCE NUMERALS

1 Support jack
2 Supporting device
3 Gearbox
4 Input shaft
5 Longitudinal axis of the support jack
9 Spindle
10 Inner sleeve
11 Means of the inner sleeve
12 Projection
13 Opening, depression
13' L-shaped opening
14 U-profile
15 Wall plate
17 Front surface
18 Inner surface
20 Outer sleeve
21 Means of the outer sleeve
24 U-profile
25 Wall plate
26 Inner side of the outer sleeve
30 Spindle nut
31 First means
32 Projection
32' Projection
32a Front surface of the projection
33 Opening, depression
35 Second means
36 Contact element
37 Support collar
38 Recess
39 Cylindrical section
40 Plane

The invention claimed is:

1. Method of assembling a support jack, in which a spindle nut is connected to an inner sleeve and the inner sleeve including the spindle nut is inserted into the outer sleeve, said method comprising the steps of:
   detachably connecting the spindle nut to the inner sleeve by means of at least one translatory movement and one rotary joining movement.

2. Method of assembling a support jack according to claim 1, said method further comprising the steps of:
   inserting the spindle nut into the inner sleeve in the direction of a longitudinal axis of the inner sleeve and
   rotating the spindle nut about the longitudinal axis relative to the inner sleeve until the spindle nut has reached an end position.

3. Method of assembling a support jack, in which a spindle nut is connected to an inner sleeve and the inner sleeve including the spindle nut is inserted into the outer sleeve, said method comprising the steps of:
   detachably connecting the spindle nut to the inner sleeve by means of at least two translatory joining movements.

4. Method of assembling a support jack according to claim 3, said method comprising the steps of:
   inserting the spindle nut into the inner sleeve in the direction of the longitudinal axis of the inner sleeve and
   displacing the spindle nut perpendicularly to the longitudinal axis until it has reached an end position.

* * * * *